United States Patent [19]
Jones et al.

[11] 4,209,183
[45] Jun. 24, 1980

[54] LOAD CARRYING PALLETS

[75] Inventors: Brian G. Jones, Wightwick; Barry Brown, West Hallam, both of England

[73] Assignee: Twil Handling Systems Limited, Kent, England

[21] Appl. No.: 960,653

[22] Filed: Nov. 14, 1978

[30] Foreign Application Priority Data

Nov. 15, 1977 [GB] United Kingdom ............... 47499/77

[51] Int. Cl.² .............................................. B62B 5/00
[52] U.S. Cl. .................................. 280/79.3; 108/55.1; 211/195; 217/43 A; 220/4 A
[58] Field of Search ................... 280/79.1 R; 220/4 A; 217/43 A; 403/321; 49/463; 248/129; 211/132, 149, 182, 189, 195; 108/55.1, 51.1, 55.5, 56.1, 56.3

[56] References Cited

U.S. PATENT DOCUMENTS 3,689,098  9/1972  Rubin .......................... 280/79.1 R X

FOREIGN PATENT DOCUMENTS 1809109  7/1969  Fed. Rep. of Germany .......... 280/79.1
763713  12/1956  United Kingdom .................... 280/79.3
1042227  9/1966  United Kingdom .

Primary Examiner—John P. Silverstrim
Assistant Examiner—D. W. Underwood
Attorney, Agent, or Firm—Lowe, King, Price & Becker

[57] ABSTRACT

A load carrying pallet of the type comprising a base provided adjacent each end of each side with a support surface level with the deck of the base and terminating in an upstanding lug, and with an upwardly facing channel subjacent each support surface, for use with detachable walls, each having at the lower end an upper transverse frame member to rest on the support surfaces and having depending leg members with lower transverse members for locating in the channels, is improved—as to ease of application and removal of the walls and as to interchangeability with known pallets—by providing between each support surface and the subjacent channel a catch on an axis parallel to the support surface, the catch having upper and lower outward projections and spring latching means, whereby, in one position of the catch the lower projection extends from the slot and over the channel, in another position of the catch the lower projection is withdrawn into the slot, and in both positions the upper projection extends from the slot.

16 Claims, 8 Drawing Figures

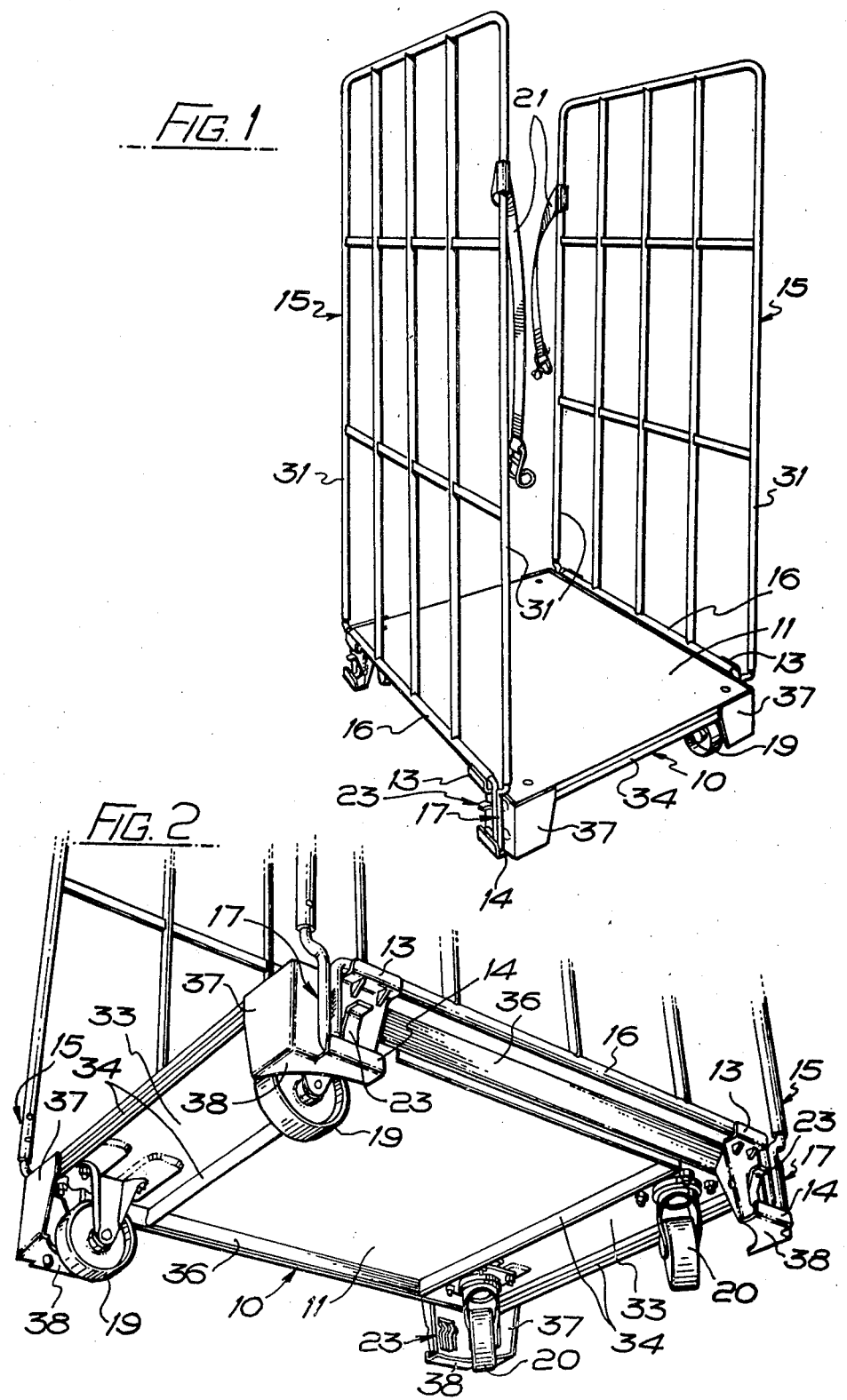

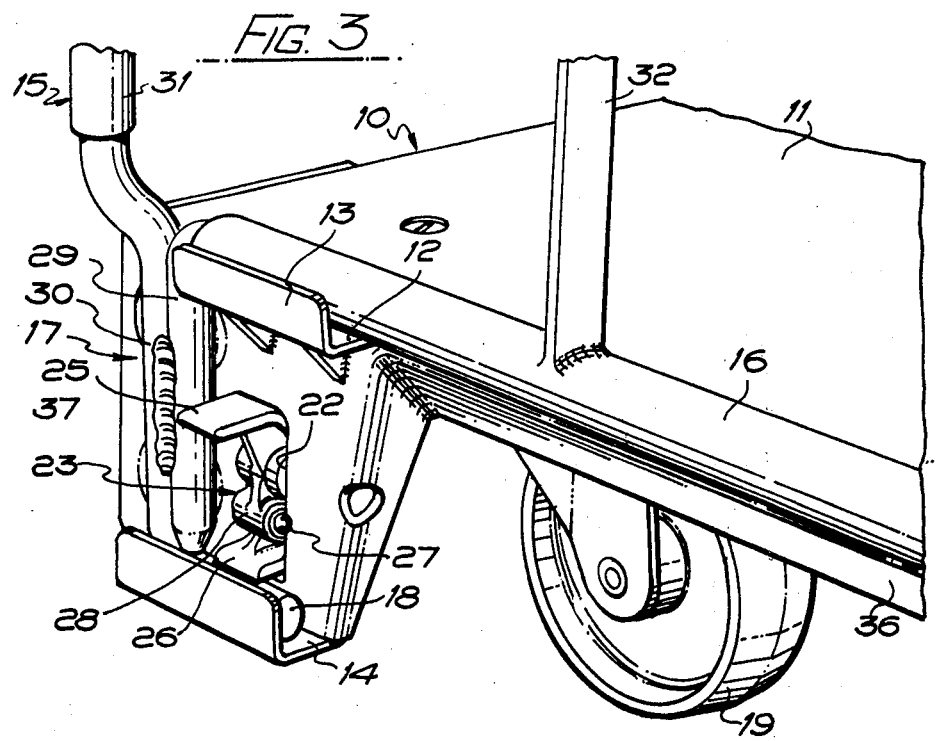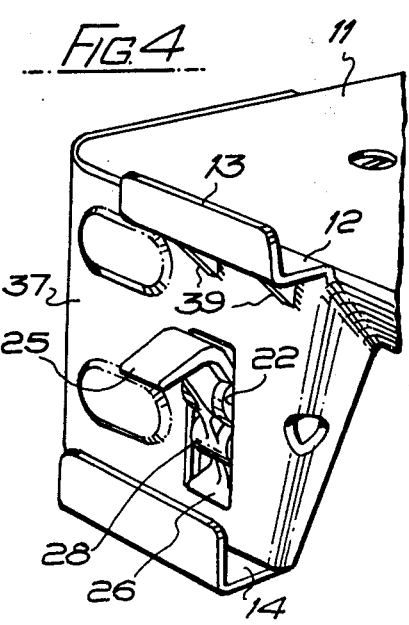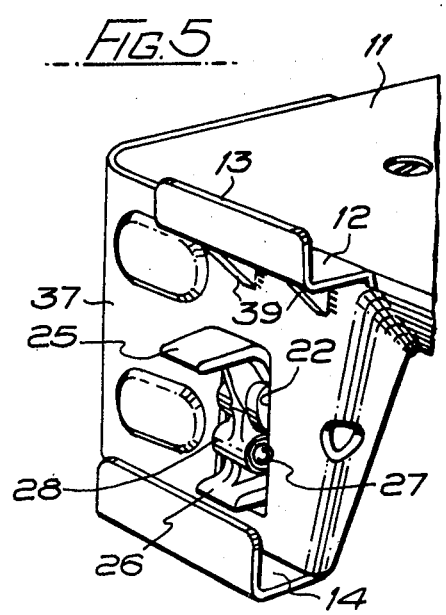

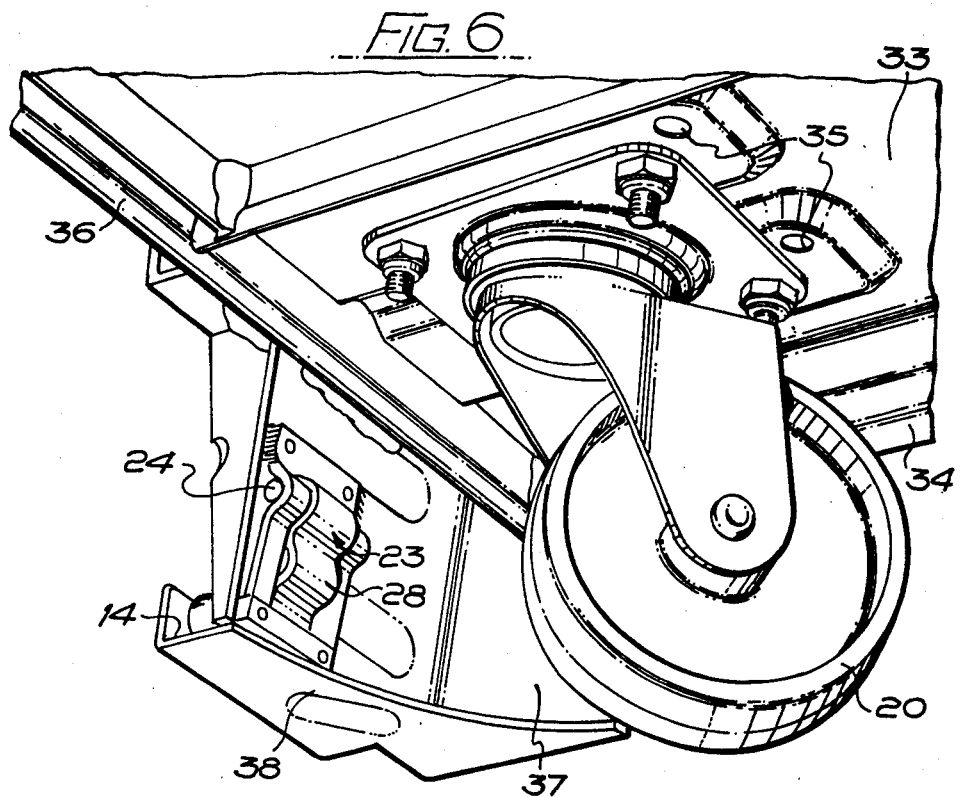
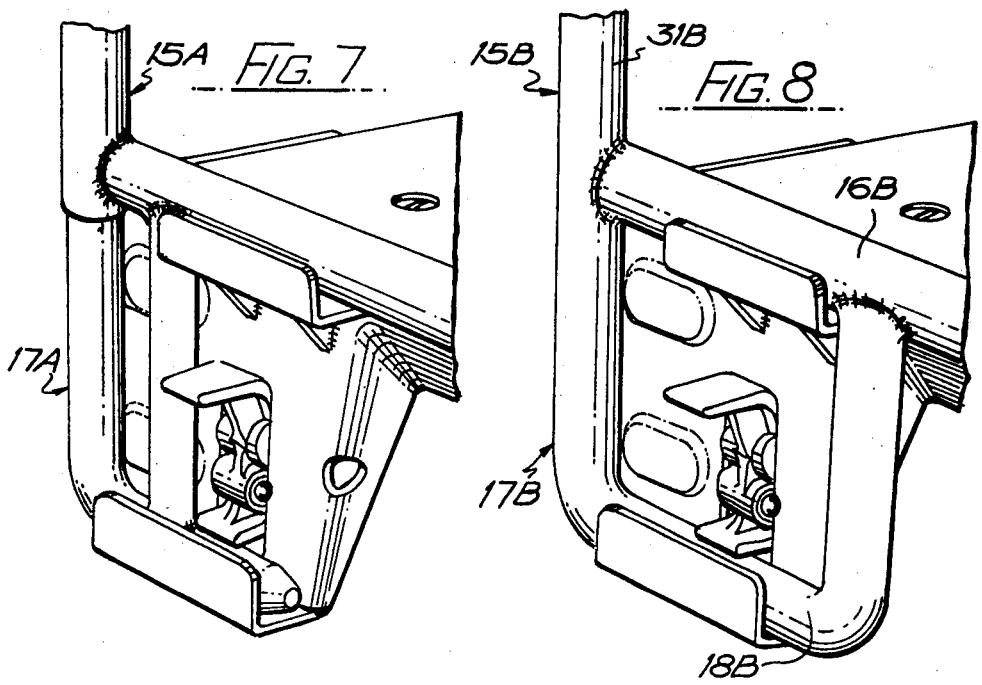

LOAD CARRYING PALLETS

This invention relates to load carrying pallets of the type comprising a base having a deck for supporting a load and provided adjacent each end of each of two opposite sides with a support surface projecting level with the deck and terminating in an upstanding lug spaced from the side, and with an upwardly facing channel subjacent each support surface and lug. Such a pallet will be referred to hereafter as a pallet of the type defined, and is intended for use with a pair of detachable walls, each wall having at the lower end of a frame an upper transverse member to rest on the support surfaces, and each wall having depending leg members to lie against one of the two sides of the base with the support surfaces, lugs and channels, and with each of the leg members provided with a lower transverse member for locating in a channel when the upper transverse member rests on the support surfaces.

Such pallets are well-known and are usually provided with wheels so as to be suitable for moving goods loaded on the base to and about, for example, supermarkets. The function of detachable walls is to retain the goods while in transit, and it is common place to provide straps between the walls to prevent them being forced apart. When the goods are to be loaded or unloaded the pallets are preferably free of walls. It is highly advantageous, therefore, to provide catch means for securing detachable walls to the base after goods have been loaded, yet readily operable to enable the walls to be released and detached for unloading the goods from the base.

The object of the invention is to provide a pallet of the type defined with catch means readily operable by the toe of an operator's foot to secure the depending leg members of detachable walls or to release them, and which do not need to be set in the release position to enable the walls to be placed in position.

According to the present invention, a pallet of the type defined is provided between each support surface and its subjacent channel with a slot in the side of the base within which is located a catch on a pivotal axis parallel to the support surface, the catch having upper and lower outward projections and spring latching means, whereby, in one position of the catch the lower projection extends from the slot and over the channel, in another position of the catch the lower projection is withdrawn into the slot, and in both positions the upper projection extends from the slot.

When a detachable walls as described above is applied in upright position to the pallet in accordance with the invention, with the upper transverse member passing clear above the lug at each end of one side of the base, the lower transverse member at each end passes between the projections of the catch, and the wall can then be lowered to bring the upper transverse member on to the support surfaces and the lower transverse members into the channels. If before applying the wall either catch is in the position in which its lower projection extends over the channel, lowering of the respective lower transverse member onto the lower projection will rock the catch and allow the lower transverse member to drop into the channel. The upper projection of each catch is pushed in turn by the toe of a foot of an operator to rock the catches to bring the lower projections over the channels, thereby preventing upward movement of the wall relative to the base of the pallet, lateral movement of the depending leg members away from the side of the base being prevented by the upstanding lugs and the outer sides of the channels restraining the upper and lower transverse members respectively. Horizontal movement of the wall in its own plane is prevented or strictly limited by contact between the depending leg members and the adjacent ends of the support surfaces.

When a detachable wall as described above is to be removed from the pallet, the upper projection of each catch is pressed downwards in turn by the toe of a foot of an operator to rock the catches to bring the lower projections back within the slots in the side of the base, leaving the lower transverse members free to move upwardly as the wall is lifted away from the base.

The pallet in accordance with the invention is adapted to hold to the base detachable walls of a variety of existing models of load carrying pallets. For example, the lower transverse members of each wall may be finger portions pointing towards each other from the lower ends of leg members continuing downwards from upright frame members at the ends of the upper transverse frame member, with the finger portions braced to the upper transverse member by welded bars or plates. Again, the lower transverse members of each wall may be the bottoms of looped leg members (formed of tube or rod) continuing downwards from upright frame members at the ends of the upper transverse frame members and back up to the upper transverse frame member.

Preferably, the pallet in accordance with the invention is provided with a pair of detachable walls with depending leg members each formed by a down-turned end of the upper transverse member welded to a downward extension of the respective upright frame member which has a finger portion constituting a lower transverse member, each downturned end and downward extension being formed of a bar provided with a spigot for securing in a tubular upright frame member or tubular upper transverse member respectively. The detachable walls preferably have mesh or lattice structures bounded by the tubular frame members, and the mesh or lattice structures are preferably formed of metal strips perpendicular to the general planes of the walls.

The pallet base is preferably provided with two fixed wheels and two castors, each pair being secured to pressed plate base members with stiffening flanges and with holes and/or slots appropriate to the bolt holes of proprietary wheels and castors, the plates being connected by pressed corrugated members welded to the plates and to corner members carrying the support surfaces, lugs, channels and catches. The corner members are preferably provided with bracing gussets across the bottom and forming the channels and at the sides to brace the support surfaces. The corner members preferably project above the pressed plates and corrugated members to provide for location of deck boarding, which is preferably formed of a material capable of withstanding repeated steam sterilisation. All the metal parts of the base and walls may be formed of stainless steel, or may be galvanised, painted, or plastic coated.

The spring latching means of each catch is preferably a spring-loaded ball projecting from a housing integral with the catch for engagement of the ball, with an upright edge of the respective slot.

An embodiment of the invention will now be described, by way of example only, with reference to the accompanying drawings, in which FIG. 1 is a general view of a load carrying pallet in accordance with the invention provided with detachable walls;

FIG. 2 is an underneath view of the pallet of FIG. 1;

FIG. 3 is a fragmentary view of one corner of the pallet of FIGS. 1 and 2;

FIG. 4 is a corresponding fragmentary view of the corner with the detachable wall removed and the catch in the open position;

FIG. 5 corresponds to FIG. 4 but shows the catch in the closed position;

FIG. 6 is a fragmentary view of a corner of the pallet of FIGS. 1 and 2 but viewed from underneath the base; and FIGS. 7 and 8 correspond to FIG. 3 but show two other forms of depending leg members for the detachable walls.

The load carrying pallet shown in the drawings is of the type comprising a base 10 having a deck 11 for supporting a load (not indicated) and provided adjacent each end of two opposite sides with a support surface 12 projecting level with the deck and terminating in an upstanding lug 13 spaced from the side, and an upwardly facing channel 14 subjacent each support surface and lug, and is used with a pair of detachable walls 15 each having at the lower end of a frame an upper transverse member 16 to rest on the support surfaces, and each having depending leg members 17 to lie against one of the two sides of the base with the support surfaces, lugs and channels, and with each of the leg members provided with a lower transverse member 18 for locating in a channel 14 when the upper transverse member 16 rests on the support surfaces 12. Wheels 19 and castors 20 are provided underneath the deck 11 of the base 10 to make the pallet suitable for moving goods loaded on the base to and about, for example, supermarkets.

The function of the detachable walls 15 is to retain the goods while in transit, and straps 21 are provided for hooking between the walls to prevent them being forced apart. When the goods are to be loaded or unloaded the walls are detached, and the invention is concerned with providing catch means for securing the walls to the base after goods have been loaded, yet readily operable to enable the walls to be released and detached for unloading the goods from the base.

Thus, the pallet is provided between each support surface 12 and its subjacent channel 14 with a slot 22 in the side of the base within which is located a catch 23 on a pivotal axis 24 parallel to the support surface, the catch having upper and lower outward projections 25, 26 respectively and spring latching means 27, whereby, in one position of the catch the lower projection 26 extends from the slot and over the channel (FIGS. 3 and 5), in another position of the catch the lower projection is withdrawn into the slot (FIG. 4), and in both positions the upper projection 25 extends from the slot. The spring latching means 27 is a spring-loaded ball (the spring not being visible) projecting from a housing 28 integral with the catch 23 for engagement of the ball with an upright edge of the respective slot 22.

When a detachable wall 15 as described above is applied in upright position to the pallet, with the upper transverse member 16 passing clear above the lug 13 at each end of one side of the base 10, the lower transverse member at each end passes between the projections 25, 26 of the catch 23, and the wall can then be lowered to bring the upper transverse member 16 on to the support surfaces 12 and the lower transverse members 18 into the channels 14. If before applying the wall 15 either catch 23 is in the position in which its lower projection 26 extends over the channel (FIG. 5), lowering of the respective lower transverse member 18 on to the lower projection will rock the catch and allow the lower transverse member to drop into the channel 14. The upper projection 25 of each catch 23 is pushed in turn by the toe of a foot of an operator to rock the catches to bring the lower projections 26 over the channels 14 (FIG. 3), thereby preventing upward movement of the wall 15 relative to the base 10 of the pallet, lateral movement of the depending leg members 17 away from the side of the base being prevented by the upstanding lugs 13 and the outer sides of the channels 14 restraining the upper and lower transverse members respectively. Horizontal movement of the wall 15 in its own plane is prevented or strictly limited by contact between the depending leg members 17 and the adjacent ends of the support surfaces 12.

When a wall 15 is to be removed from the pallet, the upper projection 25 of each catch 23 is pressed downwards in turn by the toe of a foot of an operator to rock the catches to bring the lower projections 26 back within the slots 22 in the side of the base 10 (see FIG. 4), leaving the lower transverse members 18 free to move upwardly as the wall is lifted away from the base.

The depending leg members 17 are each formed by a down-turned end 29 of the upper transverse member 16 welded to a downward extension 30 of the respective upright frame member 31 which has a finger portion constituting a lower transverse member 18, each down-turned end 29 and downward extension being formed of a bar provided with a spigot for securing in a tubular upright frame member 31 or tubular upper transverse member 16 respectively. Each wall 15 has a lattice structure bounded by the tubular frame members 16, 31, and the lattice structure is formed of metal strips 32 perpendicular to the general planes of the walls.

Each pair of wheels 19 and castors 20 of the base 10 are secured to pressed plate base members 33 with stiffening flanges 34 and with holes 35 appropriate to the bolt holes of proprietary wheels and castors, the plates being connected by pressed corrugated members 36 welded to the plates 33 and to corner members 37 carrying the support surfaces 12, lugs 13, channels 14 and catches 23. The corner members 37 are provided with gussets 38 across the bottom and forming the channels 14 and gussets 39 at the sides to brace the support surfaces 12. The corner members project above the pressed plates 33 and corrugated members 36 to provide for location of deck boarding 11, which is preferably formed of a material capable of withstanding repeated steam sterilisation.

In FIG. 7 the wall 15A is shown with a depending leg member 17A formed in somewhat different manner but to the same effect as the form described previously, but in FIG. 8 a lower transverse member 18B of a wall 15B is the bottom of a looped leg member 17B formed of tube continuing downwards from the upright frame member 31B at the end of the upper transverse frame member 16B and back up to the upper transverse frame member.

What we claim is:

1. A load carrying pallet comprising a base having a deck for supporting a load and provided adjacent each end of each of two opposite sides with a support surface projecting level with the deck and terminating in an upstanding lug spaced from the side, and with an upwardly facing channel subjacent each support surface and lug, also provided between each support surface and its subjacent channel with a slot in the side of the base within which is located a catch on a pivotal axis parallel to the support surface, the catch having upper and lower outward projections and spring latching means for biasing the catch in either of two positions, whereby, in one position of the catch the lower projection extends from the slot and over the channel, in another position of the catch the lower projection is withdrawn into the slot, and in both positions the upper projection extends from the slot.

2. A pallet as in claim 1, wherein the spring latching means of each catch is a spring-loaded ball projecting from a housing integral with the catch for engagement of the ball with an upright edge of the respective slot.

3. A pallet as in claim 1 or claim 2, having a pair of detachable walls with an upper transverse frame member resting on the support surfaces and with lower transverse members located in the channels.

4. A pallet as in claim 3, wherein the lower transverse members of the detachable walls are finger portions pointing towards each other from the lower ends of leg members continuing downwards from upright frame members at the ends of the upper transverse frame member, with the finger portions braced to the upper transverse member by welded bars or plates.

5. A pallet as in claim 3, wherein the lower transverse members of the detachable walls are the bottoms of looped leg members continuing downwards from upright frame members at the ends of the upper transverse frame members and back up to the upper transverse frame member.

6. A pallet as in claim 3, wherein each of the detachable walls is provided with depending leg members each formed by a down-turned end of the upper transverse member welded to a downward extension of the respective upright frame member which has a finger portion constituting a lower transverse member, each down-turned end and downward extension being formed of a bar provided with a spigot for securing in a tubular upright frame member or tubular upper transverse member respectively.

7. A pallet as in claim 3, wherein the detachable walls have mesh or lattice structures bounded by tubular frame members.

8. A pallet as in claim 7, wherein the mesh or lattice structures are formed of metal strips perpendicular to the general planes of the walls.

9. A pallet as in claim 1 or claim 2, wherein the base is provided with two fixed wheels and two castors including bolt holes, each pair being secured to a pressed plate base member with stiffening flanges and with holes and/or slots appropriate to the bolt holes of proprietary wheels and castors, the plates being connected by pressed corrugated members welded to the plates and to corner members carrying the support surfaces, lugs, channels and catches.

10. A pallet as in claim 9, wherein the corner members are provided with bracing gussets across the bottom and forming the channels and at the sides to brace the support surfaces.

11. A pallet as in claim 9 wherein the corner members project above the pressed plates and corrugated members to provide for location of deck boarding.

12. A pallet as in claim 11, wherein the deck boarding is formed of a material capable of withstanding repeated steam sterilisation.

13. A pallet as in claim 11, wherein all the metal parts of the base and walls are formed of stainless steel, or are galvanised, painted, or plastic coated.

14. A pallet as in claim 10 wherein the corner members project above the pressed plates and corrugated members to provide for location of deck boarding.

15. A pallet as in claim 14, wherein the deck boarding is formed of a material capable of withstanding repeated steam sterilisation.

16. A pallet as in claim 14, wherein all the metal parts of the base and walls are formed of stainless steel, or are galvanised, painted, or plastic coated.

* * * * *